US012566452B2

(12) United States Patent
Fan et al.

(10) Patent No.: US 12,566,452 B2
(45) Date of Patent: Mar. 3, 2026

(54) METHOD FOR TRAINING MIGRATION SCENE-BASED TRAJECTORY PREDICTION MODEL AND UNMANNED DRIVING DEVICE

(71) Applicant: BEIJING SANKUAI ONLINE TECHNOLOGY CO., LTD, Beijing (CN)

(72) Inventors: Mingyu Fan, Beijing (CN); Jiawen Huang, Beijing (CN); Dongchun Ren, Beijing (CN); Huaxia Xia, Beijing (CN); Yi Xu, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 105 days.

(21) Appl. No.: 18/294,369

(22) PCT Filed: Feb. 17, 2022

(86) PCT No.: PCT/CN2022/076624
§ 371 (c)(1),
(2) Date: Feb. 1, 2024

(87) PCT Pub. No.: WO2023/010827
PCT Pub. Date: Feb. 9, 2023

(65) Prior Publication Data
US 2025/0085713 A1      Mar. 13, 2025

(30) Foreign Application Priority Data
Aug. 2, 2021    (CN) .......................... 202110878026.6

(51) Int. Cl.
*G05D 1/633*       (2024.01)
*G05D 101/15*      (2024.01)

(52) U.S. Cl.
CPC ......... *G05D 1/633* (2024.01); *G05D 2101/15* (2024.01)

(58) Field of Classification Search
CPC . G05D 1/633; G05D 2101/15; B60W 30/095; G06N 3/08; G06N 20/00
See application file for complete search history.

(56) References Cited

U.S. PATENT DOCUMENTS

| | | | |
|---|---|---|---|
| 11,467,590 B2 * | 10/2022 | Halder | .................. G06N 3/006 |
| 2019/0129436 A1 | 5/2019 | Sun et al. | |
| 2019/0310650 A1 * | 10/2019 | Halder | .................... G06N 3/08 |

FOREIGN PATENT DOCUMENTS

| | | |
|---|---|---|
| CN | 105573323 A | 5/2016 |
| CN | 109359793 A | 2/2019 |

(Continued)

OTHER PUBLICATIONS

International Search Report of the International Searching Authority for State Intellectual Property Office of the People's Republic of China in PCT application No. PCT/CN2022/076624 issued on May 20, 2022, which is an international application to which this application claims priority.

(Continued)

*Primary Examiner* — Tarek Elarabi
(74) *Attorney, Agent, or Firm* — Kolitch Romano Dascenzo Gates LLP

(57) ABSTRACT

A method for training a migration scene-based trajectory prediction model is provided, a first trajectory prediction model and a plurality of candidate training samples are obtained; for any candidate training sample, a reference value corresponding to the candidate training sample is determined according to at least one of a trajectory feature corresponding to the candidate training sample or a prediction result of the first trajectory prediction model for the candidate training sample; target training samples are (Continued)

selected from the plurality of candidate training samples according to the reference values corresponding to the plurality of candidate training samples; and the first trajectory prediction model is trained according to the target training samples, to obtain a second trajectory prediction model, where the second trajectory prediction model is configured to predict traveling trajectories of obstacles in a migration scene.

17 Claims, 4 Drawing Sheets

(56) References Cited

FOREIGN PATENT DOCUMENTS

| CN | 110275531 A | 9/2019 |
| CN | 110371112 A | 10/2019 |
| CN | 111208838 A | 5/2020 |
| CN | 111332298 A | 6/2020 |
| CN | 111626097 A | 9/2020 |
| CN | 111639525 A | 9/2020 |
| CN | 111881973 A | 11/2020 |
| CN | 111912423 A | 11/2020 |
| CN | 112364997 A | 2/2021 |
| CN | 112629550 A | 4/2021 |
| CN | 112650220 A | 4/2021 |
| CN | 112712138 A | 4/2021 |
| CN | 112990375 A | 6/2021 |
| CN | 113033364 A | 6/2021 |
| CN | 113110526 A | 7/2021 |
| CN | 113325855 A | 8/2021 |
| KR | 101210729 B1 | 12/2012 |
| WO | 2021062594 A1 | 4/2021 |

OTHER PUBLICATIONS

China National Intellectual Property Administration, First office action of Chinese application No. 202110878026.6 issued on Sep. 8, 2021, which is foreign counterpart application of this US application.

Anirudh VemulA et al., "Social attention: Modeling attention in human crowds" in 2018 IEEE International Conference on Robotics and Automation (ICRA), Brisbane, Australia, pp. 4601-4607, May 21-25, 2018.

Agrim Gupta, "Social GAN: Socially acceptable trajectories with generative adversarial networks," in 2018 IEEE Conference on Computer Vision and Pattern Recognition (CVPR), Salt Lake City, UT, USA, pp. 2255-2264, Jun. 18-23, 2018.

* cited by examiner

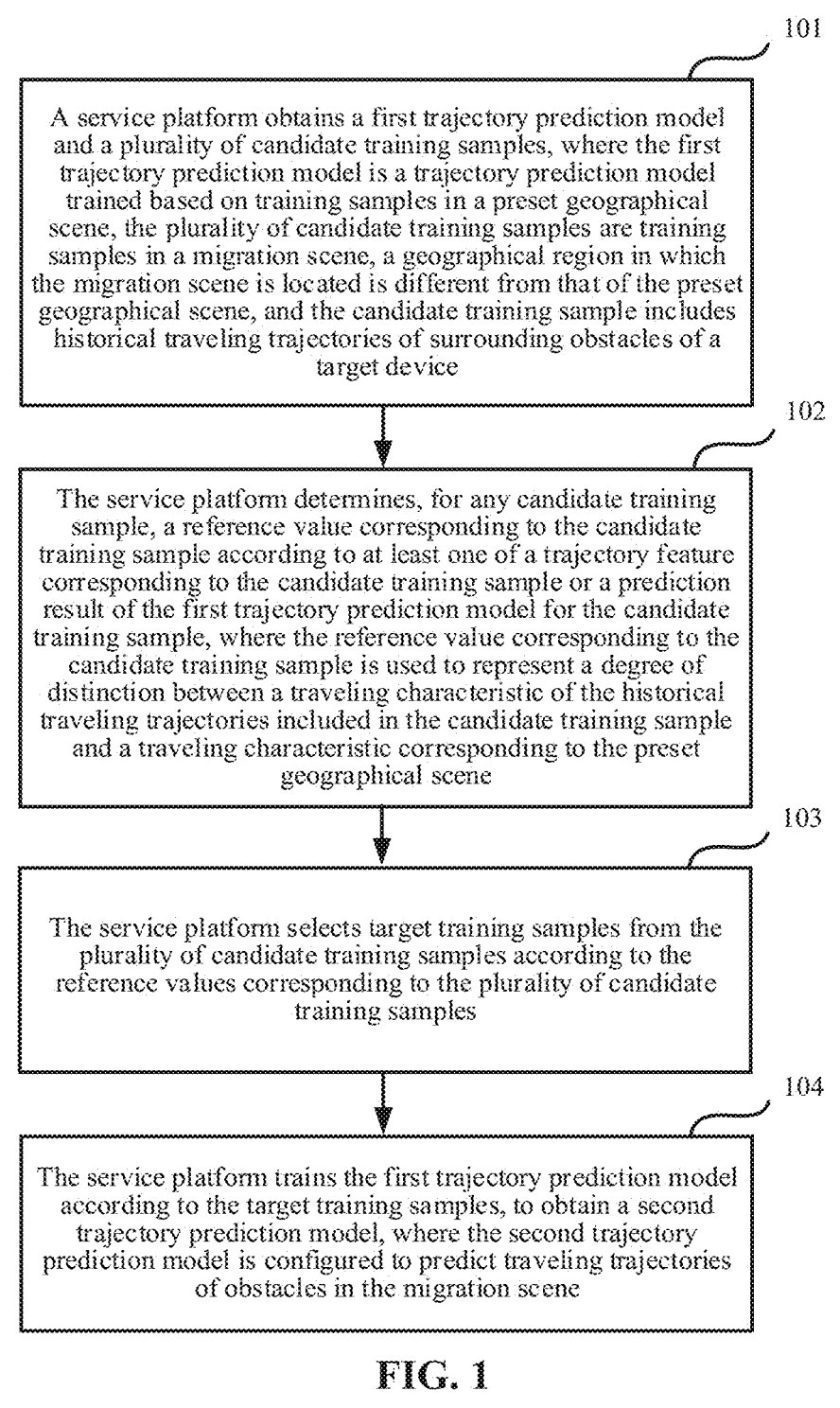

101

A service platform obtains a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device

102

The service platform determines, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene

103

The service platform selects target training samples from the plurality of candidate training samples according to the reference values corresponding to the plurality of candidate training samples

104

The service platform trains the first trajectory prediction model according to the target training samples, to obtain a second trajectory prediction model, where the second trajectory prediction model is configured to predict traveling trajectories of obstacles in the migration scene

FIG. 1

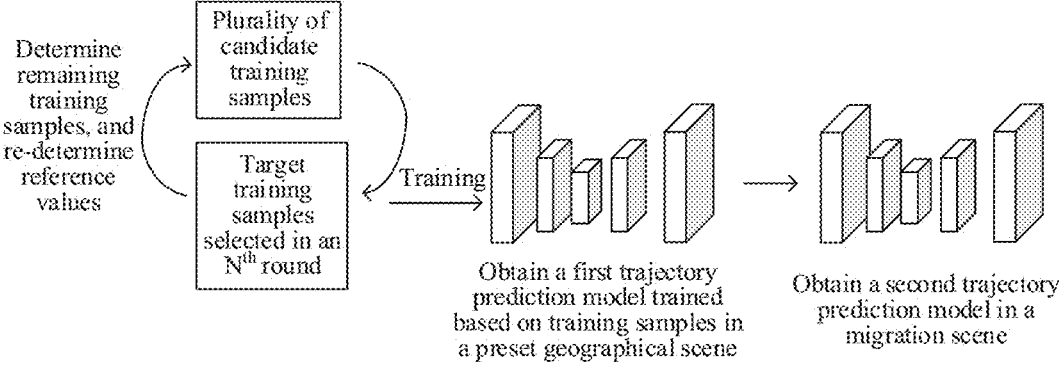

Determine remaining training samples, and re-determine reference values

Plurality of candidate training samples

Target training samples selected in an N$^{th}$ round

Training

Obtain a first trajectory prediction model trained based on training samples in a preset geographical scene Obtain a second trajectory prediction model in a migration scene

FIG. 2

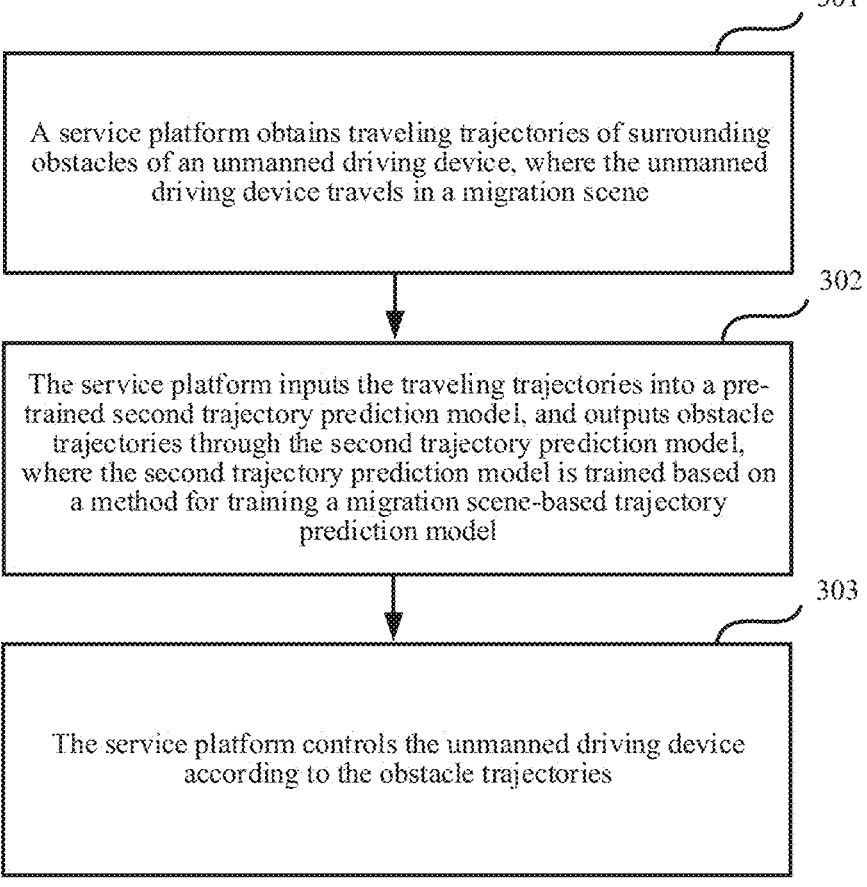

301

A service platform obtains traveling trajectories of surrounding obstacles of an unmanned driving device, where the unmanned driving device travels in a migration scene

302

The service platform inputs the traveling trajectories into a pre-trained second trajectory prediction model, and outputs obstacle trajectories through the second trajectory prediction model, where the second trajectory prediction model is trained based on a method for training a migration scene-based trajectory prediction model

303

The service platform controls the unmanned driving device according to the obstacle trajectories

FIG. 3

METHOD FOR TRAINING MIGRATION SCENE-BASED TRAJECTORY PREDICTION MODEL AND UNMANNED DRIVING DEVICE

CROSS REFERENCE TO RELATED APPLICATION

This application is a U.S. national phase application based on PCT international application PCT/CN2022/076624 filed on Feb. 17, 2022, which claims priority to Chinese Patent Application No. 202110878026.6, entitled "METHOD FOR TRAINING MIGRATION SCENE-BASED MODEL FOR OBSTACLE TRAJECTORY PREDICTION" and filed on Aug. 2, 2021, which are incorporated herein by reference in their entireties.

TECHNICAL FIELD

This application relates to the field of unmanned driving, and in particular, to a method for training a migration scene-based trajectory prediction model and an unmanned driving device.

BACKGROUND

With the continuous development of the information technology, unmanned driving has begun to enter people's lives. In practical applications, ensuring safe traveling of an unmanned driving device is a prerequisite for performing various tasks through the unmanned driving device. For the safe traveling of the unmanned driving device, the unmanned driving device needs to be enabled to predict future trajectories of surrounding obstacles, so that the unmanned driving device can formulate a traveling policy in advance, to travel safely.

SUMMARY

This application provides a method for training a migration scene-based trajectory prediction model and an unmanned driving device. The technical solutions are as follows:

In some embodiments, a method for training a migration scene-based trajectory prediction model is provided, including:

obtaining a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device;

determining, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene;

selecting target training samples from the plurality of candidate training samples according to the reference values corresponding to the plurality of candidate training samples; and training the first trajectory prediction model according to the target training samples, to obtain a second trajectory prediction model, where the second trajectory prediction model is configured to predict traveling trajectories of obstacles in the migration scene.

In some embodiments, a method for controlling an unmanned driving device is provided, including:

obtaining traveling trajectories of surrounding obstacles of an unmanned driving device, where the unmanned driving device travels in a migration scene;

inputting the traveling trajectories into a pre-trained second trajectory prediction model, and outputting obstacle trajectories through the second trajectory prediction model, where the second trajectory prediction model is trained based on the foregoing method for training a migration scene-based trajectory prediction model; and controlling the unmanned driving device according to the obstacle trajectories.

In some embodiments, a non-transitory computer-readable storage medium is provided, having a computer program stored therein, where the computer program, when executed by a processor, implements the following steps:

obtaining a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device;

determining, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene;

selecting target training samples from the plurality of candidate training samples according to the reference values corresponding to the plurality of candidate training samples; and training the first trajectory prediction model according to the target training samples, to obtain a second trajectory prediction model, where the second trajectory prediction model is configured to predict traveling trajectories of obstacles in the migration scene.

In some embodiments, a non-transitory computer-readable storage medium is provided, having a computer program stored therein, where the computer program, when executed by a processor, implements the following steps:

obtaining traveling trajectories of surrounding obstacles of an unmanned driving device, where the unmanned driving device travels in a migration scene;

inputting the traveling trajectories into a pre-trained second trajectory prediction model, and outputting obstacle trajectories through the second trajectory prediction model, where the second trajectory prediction model is trained based on the foregoing method for training a migration scene-based trajectory prediction model; and controlling the unmanned driving device according to the obstacle trajectories.

In some embodiments, an unmanned driving device is provided, including a memory, a processor, and a computer program stored in the memory and executable by the processor, where when executing the program, the processor implements the following steps:

obtaining a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device;

determining, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene;

selecting target training samples from the plurality of candidate training samples according to the reference values corresponding to the plurality of candidate training samples; and training the first trajectory prediction model according to the target training samples, to obtain a second trajectory prediction model, where the second trajectory prediction model is configured to predict traveling trajectories of obstacles in the migration scene.

In some embodiments, an unmanned driving device is provided, including a memory, a processor, and a computer program stored in the memory and executable by the processor, where when executing the program, the processor implements the following steps:

obtaining traveling trajectories of surrounding obstacles of an unmanned driving device, where the unmanned driving device travels in a migration scene;

inputting the traveling trajectories into a pre-trained second trajectory prediction model, and outputting obstacle trajectories through the second trajectory prediction model, where the second trajectory prediction model is trained based on the foregoing method for training a migration scene-based trajectory prediction model; and controlling the unmanned driving device according to the obstacle trajectories.

BRIEF DESCRIPTION OF THE DRAWINGS

The accompanying drawings illustrated herein are used to provide further understanding of this specification and constitute a part of this specification.

FIG. 1 is a schematic flowchart of a method for training a migration scene-based trajectory prediction model according to an embodiment of this application;

FIG. 2 is a schematic diagram of performing iterative training on a trajectory prediction model according to an embodiment of this application;

FIG. 3 is a schematic flowchart of a method for controlling an unmanned driving device according to an embodiment of this application;

DETAILED DESCRIPTION

Figure 4:
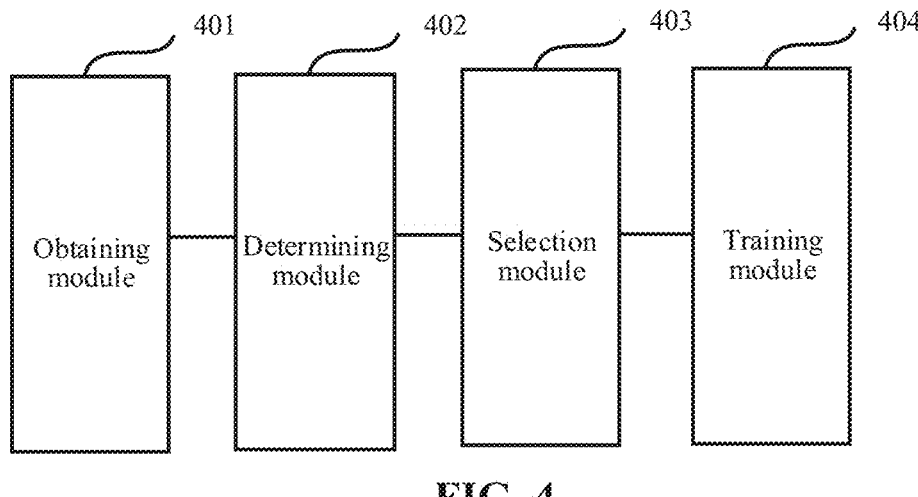
FIG. 4 is a schematic diagram of an apparatus for training a migration scene-based trajectory prediction model according to an embodiment of this application.

To make the objectives, technical solutions, and advantages of this application clearer, the technical solutions of this application are described clearly and thoroughly below with reference to specific embodiments of this application and corresponding accompanying drawings. It is clear that the described embodiments are merely some but not all of embodiments of this application. All other embodiments obtained by a person of ordinary skill in the art based on embodiments of this application without creative efforts shall fall within the protection scope of this application.

In the related art, a trajectory prediction usually has different effects on an unmanned driving device traveling in different geographical scenes. For example, a trajectory prediction model may be trained based on a large amount of trajectory data of a place A, but if the model is applied to trajectory prediction on an unmanned driving device traveling at a place B, a predicted trajectory may be inaccurate. Therefore, such a method in the prior art may be inaccurate to some extent. However, if the trajectory prediction model is re-trained directly based on all trajectory data of the place B, a large amount of data is required, and the efficiency is low.

How to improve the accuracy of trajectory prediction in different geographical scenes and improve the efficiency of model training is an urgent problem to be resolved.

The technical solutions provided in the embodiments of this application are described below in detail with reference to the accompanying drawings.

FIG. 1 is a schematic flowchart of a method for training a migration scene-based trajectory prediction model in this application, including the following steps:

101. A service platform obtains a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device.

In some embodiments, if the service platform needs to operate an unmanned driving device in a geographical scene, the service platform often needs to train a trajectory prediction model based on traveling trajectories of target objects (such as vehicles and pedestrians) in the geographical scene. Obstacle trajectories of the target objects in the geographical scene can be predicted through the trajectory prediction model based on the traveling trajectories of the target objects, such that the unmanned driving device can avoid the target objects in the geographical scene based on the obstacle trajectories. In a case that the service platform subsequently wants to operate the unmanned driving device in another geographical scene, the previously trained trajectory prediction model usually cannot be directly adapted to trajectory prediction in the another geographical scene. In this case, a trajectory prediction model for performing trajectory prediction in another geographical scene needs to be trained. In the foregoing descriptions, a target object is an obstacle.

Based on this, the service platform can obtain a first trajectory prediction model trained in advance based on training samples in a preset geographical scene. In some embodiments, the first trajectory prediction model is a trajectory prediction model trained by the service platform based on training samples in a preset geographical scene, or is a trajectory prediction model trained by another service platform based on the training samples in the preset geographical scene, which is not limited in this embodiment of this application. The service platform obtains a plurality of training samples in a migration scene, and uses the plurality of training samples as a plurality of candidate training samples, where a geographical region in which the migration scene is located is different from that of the preset geographical scene, and each candidate training sample includes historical traveling trajectories of surrounding obstacles of a target device.

In some embodiments, that the geographical region of the migration scene is different from that of the preset geographical scene may include a plurality of situations. For example, the migration scene and the preset geographical scene are different cities, the migration scene is a city A, and the preset geographical scene is a city B. For another example, the preset geographical scene is a city, and the migration scene a rural area. Traveling habits of obstacles (such as vehicles and pedestrians) in the migration scene may be different from those in the preset geographical scene. The target device mentioned above may refer to an unmanned driving device, for example, an unmanned driving vehicle or an ordinary vehicle. In some embodiments, the target device is also referred to as a designated device.

In some embodiments, the plurality of training samples in the migration scene obtained by the service platform are prepared for further training of the foregoing first trajectory prediction model. Since the first trajectory prediction model is trained based on the training samples in the preset geographical scene, trajectory prediction performed by the first trajectory prediction model in the migration scene may have a poor effect. Therefore, the trajectory prediction model needs to be further trained based on training samples in the migration scene.

In this embodiment of this application, the trajectory prediction model may be trained by a server in the service platform, a server included by the unmanned driving device, or the like. To facilitate description, all the steps in model training are described by using the service platform as an execution body.

102. The service platform determines, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene.

In some embodiments, after obtaining a plurality of candidate training samples, the service platform may perform training for each candidate training sample. For example, the service platform may determine a reference value corresponding to the candidate training sample according to at least one of a trajectory feature corresponding to the historical traveling trajectories included in the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene.

The service platform may determine the reference values based on only trajectory features corresponding to the plurality of candidate training samples, or only prediction results of the trajectory prediction model for the candidate training samples, or a combination of the two, and can subsequently select target training samples based on the reference values. The service platform may determine the reference values in many ways. In some embodiments, for any candidate training sample, the service platform determines a first reference value corresponding to the candidate training sample according to the prediction result of the first trajectory prediction model for the candidate training sample, where the first reference value is used to represent a degree of uncertainty of trajectory prediction performed by the first trajectory prediction model based on the candidate training sample. In a case that the reference value corresponding to the candidate training sample is determined based on only the prediction results of the trajectory prediction model for the candidate training samples, the first reference value is a reference value corresponding to the candidate training sample.

In some embodiments, for a candidate training sample, the service platform determines a degree of difference between the prediction result of the first trajectory prediction model for the candidate training sample and an annotation result corresponding to the candidate training sample. The service platform determines the first reference value corresponding to the candidate training sample according to the degree of difference. Alternatively, the service platform may determine a confidence of the prediction result of the first trajectory prediction model for the candidate training sample, and use the confidence as the first reference value.

In some embodiments, for any candidate training sample, the service platform determines a second reference value corresponding to the candidate training sample according to a trajectory feature corresponding to the candidate training sample, where the second reference value is used to represent diversity of the candidate training sample in the training samples for training the trajectory prediction model. In some embodiments, a purpose of determining the second reference value is to expect that the training sample selected for training the trajectory prediction model can have diversity, so that a variety of traveling trajectories may be included in the selected training sample. In this way, it may also be guaranteed to select, from the candidate training samples, a training sample whose traveling characteristic is different from that of the preset geographical scene. In a case that the reference value corresponding to the candidate training sample is determined based on only trajectory features corresponding to the candidate training samples, the second reference value is a reference value corresponding to the candidate training sample.

In some embodiments, when determining the second reference value, the service platform may determine, for each candidate training sample, a degree of difference between the trajectory feature corresponding to the historical traveling trajectories included in the candidate training sample and a trajectory feature corresponding to the training samples in the preset geographical scene, and use the degree of difference as the second reference value corresponding to the candidate training sample. The trajectory feature mentioned herein may refer to a feature vector corresponding to the historical traveling trajectories included in a training sample.

After determining the foregoing first reference value and/or second reference value, the service platform can determine reference values corresponding to candidate training samples based on the first reference values of the candidate training samples and/or the second reference values of the candidate training samples, that is, the service platform may obtain the reference value by combining the first reference value and the second reference value, or may determine the reference value based on only the first reference value or the second reference value. Moreover, if the foregoing reference value is calculated by combining the first reference value and the second reference value, different weights may be set for the first reference value and the second reference value, to determine the reference value.

103. The service platform selects target training samples from the plurality of candidate training samples according to the reference values corresponding to the plurality of candidate training samples.

Through step 103, the service platform may select, from all the training samples in the migration scene, training samples that are valuable to the first trajectory prediction model as target training samples, and train the trajectory prediction model based on the target training samples, to improve the generalization capability of the first trajectory prediction model, and to expand the scope of application of the first trajectory prediction model. Therefore, candidate training samples whose traveling characteristics are different from the traveling characteristic corresponding to the preset geographical scene to some extent can be selected as target training samples. The target training samples can express the unique traveling characteristic of the migration scene, so that the first trajectory prediction model is enabled to learn the target training samples possessed by the migration scene, to improve the accuracy of the trajectory prediction model for trajectory prediction in the migration scene. In other words, the target training samples can reflect differences between the migration scene and the preset geographical scene.

In some embodiments, in a case that the service platform determines the first reference value based on the confidence of the prediction result of the first trajectory prediction model for the candidate training sample, the target training samples determined based on the first reference value are candidate training samples with some uncertainty when the first trajectory prediction model performs trajectory prediction. Training the trajectory prediction model based on the target training samples can improve the accuracy of the trajectory prediction model, and the traveling characteristics of the target training samples are likely to be different from the traveling characteristic corresponding to the preset geographical scene, and are valuable to the training of the trajectory prediction model.

However, if the target training samples are selected based on only the first reference values, there may be an abnormal training sample in the selected target training samples. For example, there may be some noise in historical traveling trajectories included in a selected target training sample, that is, a wrong trajectory may be collected due to signal instability during collection of the traveling trajectories. For another example, traveling trajectories in a selected target training sample may be special, for example, include an emergency stop, speeding, or the like. Therefore, in addition to the foregoing method based on the first reference values, the service platform may also select the target training samples by combining the first reference values with reference values of another type. For example, the service platform may determine the target training samples based on the second reference value of the candidate training sample, or determine the target training samples based on the reference values obtained from the first reference values and the second reference values, which is not limited in this embodiment of this application.

104. The service platform trains the first trajectory prediction model according to the target training samples, to obtain a second trajectory prediction model, where the second trajectory prediction model is configured to predict traveling trajectories of obstacles in the migration scene.

In some embodiments, after determining the reference values corresponding to the candidate training samples, the service platform may select target training samples from the candidate training samples, and train the first trajectory prediction model according to the target training samples. That is, the service platform may select candidate training samples with higher reference values as the selected target training samples, and perform model training based on the target training samples. In some embodiments, the service platform may preset a proportion of selected target training samples to candidate training samples, and perform selection according to the proportion. Alternatively, the service platform may sort candidate training samples in descending order according to reference values, and select candidate training samples ranking higher than a set ranking as target training samples.

It should be noted that when selecting the target training samples, the service platform may select all the required target training samples at a time according to the reference values or may select, during iterative training, some target training samples each time, after performing a round of training on the first trajectory prediction model based on the target training samples, select target training samples again, and perform a next round of training based on the selected target training samples until the first trajectory prediction model is trained to converge.

In some embodiments, the service platform determines a plurality of remaining training samples in the plurality of candidate training samples after training the first trajectory prediction model based on target training samples selected in an $(N-1)^{th}$ round of training, where the plurality of remaining training samples are candidate training samples in the plurality of candidate training samples other than target training samples selected in previous N–1 rounds, and N is a positive integer. The service platform re-determines reference values corresponding to the plurality of remaining training samples. The service platform selects, according to the re-determined reference values corresponding to the plurality of remaining training samples, from the plurality of remaining training samples, target training samples required by an $N^{th}$ round of training. The service platform performs the $N^{th}$ round of training on the first trajectory prediction model according to the target training samples required by the $N^{th}$ round of training until the first trajectory prediction model meets a preset training objective, to obtain the second trajectory prediction model.

For the foregoing training process, refer to FIG. 2. FIG. 2 is a schematic diagram of performing iterative training on a trajectory prediction model according to this application.

As can be seen from FIG. 2, the service platform may select a specific quantity of target training samples from the candidate training samples each time, perform a stage of training on the first trajectory prediction model based on the target training samples, then, re-determine reference values of remaining training samples (that is, candidate training samples that have not been selected as target training samples in the candidate training samples) when target training samples are selected a next time, then select target training samples from the current remaining training samples based on the reference values of the remaining training samples, and so on until the first trajectory prediction model is trained to be capable of performing accurate trajectory prediction in the migration scene.

In some embodiments, during each time of iterative training, the service platform inputs the target training sample into the first trajectory prediction model, performs prediction through the first trajectory prediction model based on the target training sample, and outputs predicted obstacle trajectories. The service platform trains the first trajectory prediction model based on differences between labeled obstacle trajectories corresponding to the target training sample and the predicted obstacle trajectories. A process of training the first trajectory prediction model is a process of updating a model parameter of the first trajectory prediction model.

In some embodiments, if both the first reference values and the second reference values are used when initial reference values of the candidate training samples are determined, both the first reference values and the second reference values may be re-determined each time the reference values corresponding to the remaining training samples are re-determined. Certainly, if only reference values of one type are used, only the reference values of the type may be re-determined.

Each time the first reference values are re-determined, because a round of iterative training has been performed on the first trajectory prediction model before, the accuracy of the first trajectory prediction model is improved to some extent. Therefore, trajectory prediction may be performed on the remaining training samples again through the current first trajectory prediction model, to obtain prediction results. The service platform re-determines the first reference values according to the prediction results.

Moreover, when the second reference values are re-determined, a method of determining the second reference values may be adjusted as follows: The service platform determines, for each remaining training sample, a degree of difference between a trajectory feature corresponding to the remaining training sample and a trajectory feature corresponding to the selected target training samples. The service platform determines the degree of difference as the re-determined second reference value corresponding to the remaining training sample, and determines a reference value corresponding to the remaining training sample according to the re-determined second reference value.

That is, the service platform may use a degree of difference between a trajectory feature corresponding to the historical traveling trajectories included in the candidate training sample and a trajectory feature corresponding to the training samples in the preset geographical scene as an initialized value of the second reference value. Starting from a second round of selecting target training samples, second reference values of the target training samples are determined by using degree of differences between the trajectory features corresponding to the remaining training samples and the trajectory features corresponding to the selected target training samples. Certainly, there are many ways to initialize the second reference value, for example, setting the second reference value to a fixed value. The reason why the second reference value is determined in this way is to make the selected target training sample itself have diversity.

The foregoing describes, from merely the perspective of training the trajectory prediction model, the method for training a migration scene-based trajectory prediction model provided by this application. However, the trajectory prediction model needs to be applied to trajectory prediction on traveling of an unmanned driving device in a migration scene. That is to say, after the first trajectory prediction model is trained in the foregoing manner, the trained second trajectory prediction model may be configured on the unmanned driving device for trajectory prediction by the unmanned driving device in the migration scene. Therefore, the unmanned driving device may obtain traveling trajectories of surrounding obstacles, input the traveling trajectories of the surrounding obstacles into the trained second trajectory prediction model, to obtain predicted obstacle trajectories, and control the unmanned driving device according to the predicted obstacle trajectories. In some embodiments, the unmanned driving device travels at least in the migration scene. That is, the unmanned driving device not only can travel in the migration scene, but also can travel in another geographical scene. Moreover, when the unmanned driving device travels in the migration scene, trajectory prediction may be performed through the trained second trajectory prediction model.

Therefore, descriptions are provided below from the perspective of the unmanned driving device, as shown in FIG. 3.

FIG. 3 is a schematic flowchart of a method for controlling an unmanned driving device according to this application.

301. A service platform obtains traveling trajectories of surrounding obstacles of an unmanned driving device, where the unmanned driving device travels in a migration scene.

302. The service platform inputs the traveling trajectories into a pre-trained second trajectory prediction model, and outputs obstacle trajectories through the second trajectory prediction model, where the second trajectory prediction model is trained based on the method for training a migration scene-based trajectory prediction model.

That is, the second trajectory prediction model is trained through the foregoing steps 101 to 104.

303. The service platform controls the unmanned driving device according to the obstacle trajectories.

The unmanned driving device mentioned above may refer to a device that can realize autonomous driving such as an unmanned automobile, an unmanned aerial vehicle, and an automatic delivery device. Based on this, the method for training a migration scene-based trajectory prediction model and the method for controlling an unmanned driving device provided in this application may be used for an unmanned driving device to perform trajectory prediction in a migration scene. The unmanned driving device may be specifically applied to the field of delivery through unmanned driving devices, for example, scenarios of using the unmanned driving devices to perform delivery services such as parcel delivery, logistics, and food delivery.

It can be seen from the foregoing methods that the service platform may further train, for the first trajectory prediction model trained in advance based on the training samples in the preset geographical scene, the first trajectory prediction model using training samples in the migration scene. During the training, proper training samples may be selected from the training samples in the migration scene as target training samples, and the first trajectory prediction model is trained using the target training samples. In some embodiments, a policy according to which the service platform performs selection may be based on the first reference values, that is, inaccuracy of trajectory prediction performed by the trajectory prediction model on candidate training samples, so that the trajectory prediction model can perform accurate prediction for the migration scene and select target training samples with diversity based on the second reference values, to lower a proportion of abnormal samples included in the training samples used for training the second trajectory prediction model, thereby further improving the accuracy of trajectory prediction performed by the second trajectory prediction model.

The method for training a migration scene-based trajectory prediction model and the method for controlling an unmanned driving device are provided above. Based on the same idea, an embodiment of this application further provides a corresponding apparatus for training a model and a corresponding apparatus for controlling an unmanned driving device, as shown in FIG. 4 and FIG. 5.

Figure 5:
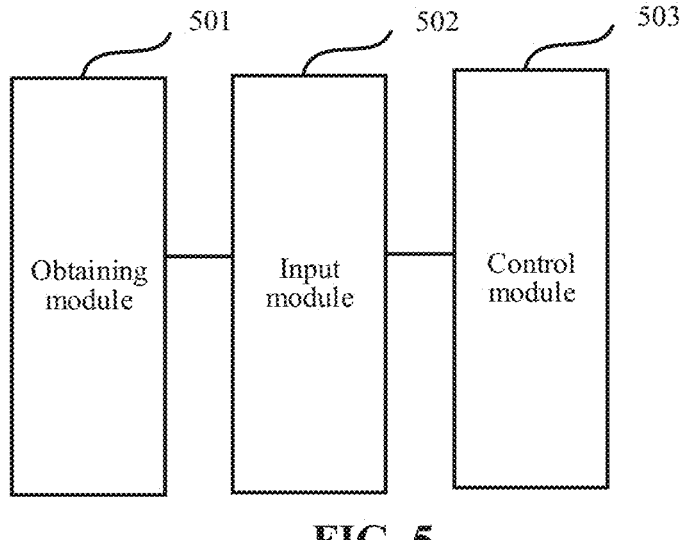
FIG. 5 is a schematic diagram of an apparatus for controlling an unmanned driving device according to an embodiment of this application.

FIG. 4 is a schematic diagram of an apparatus for training a migration scene-based trajectory prediction model according to an embodiment of this application, including:

an obtaining module 401, configured to obtain a first trajectory prediction model and a plurality of candidate training samples, where the first trajectory prediction model is a trajectory prediction model trained based on training samples in a preset geographical scene, the plurality of candidate training samples are training samples in a migration scene, a geographical region in which the migration scene is located is different from that of the preset geographical scene, and the candidate training sample includes historical traveling trajectories of surrounding obstacles of a target device;

a determining module 402, configured to determine, for any candidate training sample, a reference value corresponding to the candidate training sample according to at least one of a trajectory feature corresponding to the candidate training sample or a prediction result of the first trajectory prediction model for the candidate training sample, where the reference value corresponding to the candidate training sample is used to represent a degree of distinction between a traveling characteristic of the historical traveling trajectories included in the candidate training sample and a traveling characteristic corresponding to the preset geographical scene;

a selection module 403, configured to select target training samples from the plurality of candidate training samples according to the reference values corresponding to the plurality of candidate training samples; and a training module 404, configured to train the first trajectory prediction model according to the target training samples, to obtain a second trajectory prediction model, where the second trajectory prediction model is configured to predict traveling trajectories of obstacles in the migration scene.

In some embodiments, the determining module 402 is configured to determine a first reference value corresponding to the candidate training sample according to the prediction result of the first trajectory prediction model for the candidate training sample, where the first reference value is used to represent a degree of uncertainty of trajectory prediction performed by the first trajectory prediction model based on the candidate training sample; determine a second reference value corresponding to the candidate training sample according to the trajectory feature corresponding to the candidate training sample, where the second reference value is used to represent diversity of the candidate training sample in the training samples for training the first trajectory prediction model; and determine the reference value corresponding to the candidate training sample according to at least one of the first reference value corresponding to the candidate training sample or the second reference value corresponding to the candidate training sample.

In some embodiments, the determining module 402 is configured to determine, for each candidate training sample, a degree of difference between the prediction result of the first trajectory prediction model for the candidate training sample and an annotation result corresponding to the candidate training sample; and determine the first reference value corresponding to the candidate training sample according to the degree of difference.

In some embodiments, the determining module 402 is configured to determine a degree of difference between the trajectory feature corresponding to the candidate training sample and a trajectory feature corresponding to the training samples in the preset geographical scene as the second reference value corresponding to the candidate training sample.

In some embodiments, the training module 404 is configured to determine a plurality of remaining training samples in the plurality of candidate training samples after training the first trajectory prediction model based on target training samples selected in an $(N-1)^{th}$ round of training, where the plurality of remaining training samples are candidate training samples in the plurality of candidate training samples other than target training samples selected in previous $N-1$ rounds, and N is a positive integer; re-determine reference values corresponding to the plurality of remaining training samples; select, according to the re-determined reference values corresponding to the plurality of remaining training samples, from the plurality of remaining training samples, target training samples required by an $N^{th}$ round of training; perform the $N^{th}$ round of training on the first trajectory prediction model according to the target training samples required by the $N^{th}$ round of training until the first trajectory prediction model meets a preset training objective, to obtain the second trajectory prediction model.

In some embodiments, the determining module 402 is configured to determine, for any remaining training sample, a second reference value corresponding to the remaining training sample, where the second reference value is a degree of difference between a trajectory feature corresponding to the remaining training sample and a trajectory feature corresponding to the selected target training samples, and the second reference value is used to represent diversity of the remaining training sample in the training samples for training the first trajectory prediction model; and determine a reference value corresponding to the remaining training sample according to the second reference value corresponding to the remaining training sample.

FIG. 5 is a schematic diagram of an apparatus for controlling an unmanned driving device according to an embodiment of this application, including:

an obtaining module 501, configured to obtain traveling trajectories of surrounding obstacles of an unmanned driving device, where the unmanned driving device travels in a migration scene;

an output module 502, configured to input the traveling trajectories into a pre-trained second trajectory prediction model, and output obstacle trajectories through the second trajectory prediction model, where the second trajectory prediction model is trained based on the foregoing method for training a migration scene-based trajectory prediction model; and a control module 503, configured to control the unmanned driving device according to the obstacle trajectories.

An embodiment of this application further provides a non-transitory computer-readable storage medium. The storage medium has a computer program stored therein. The computer program may be used for performing a method for training a migration scene-based trajectory prediction model and a method for controlling an unmanned driving device provided in FIG. 1 or FIG. 3.

Figure 6:
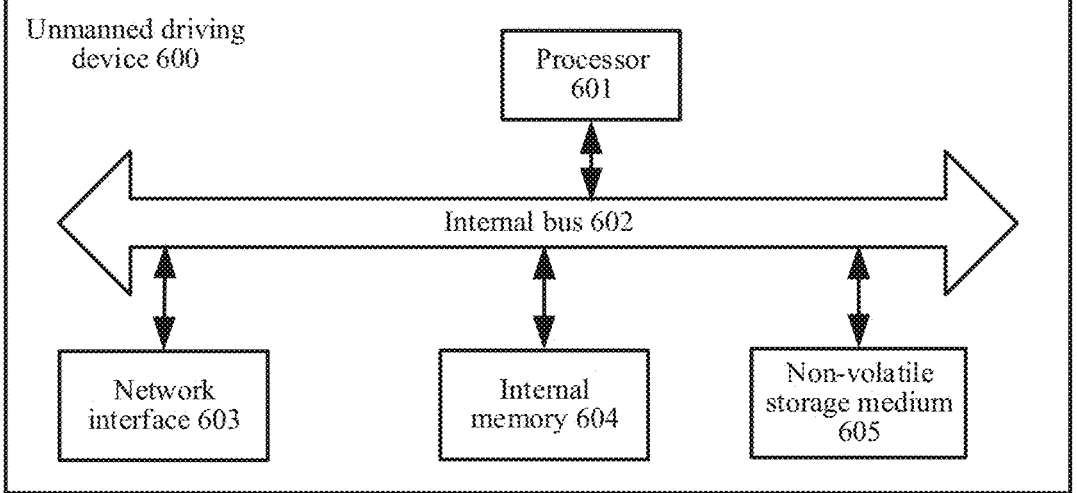
FIG. 6 is a schematic diagram of an unmanned driving device corresponding to FIG. 1 or FIG. 3 according to an embodiment of this application.

An embodiment of this application further provides a schematic structural diagram, shown in FIG. 6, of an unmanned driving device 600 corresponding to FIG. 1 or FIG. 3. As shown in FIG. 6, at the hardware level, the unmanned driving device includes a processor 601, an internal bus 602, a network interface 603, an internal memory 604, and a non-transitory memory 605, and certainly may further include hardware required for other services. The processor 601 reads a corresponding computer program from the non-transitory memory 605 into the memory and then runs the computer program, to implement the method for training a migration scene-based trajectory prediction model and the method for controlling an unmanned driving device according to FIG. 1 or FIG. 3. Definitely, in addition to a software implementation, this application does not exclude other implementations, for example, a logic device or a combination of software and hardware. In other words, an entity executing the following processing procedure is not limited to the logic units, and may also be hardware or logic devices.

The system, the apparatus, the module or the unit described in the foregoing embodiments may be implemented by a computer chip or an entity, or implemented by a product having a certain function. A typical implementation device is a computer. In some embodiments, the computer may be, for example, an in-vehicle terminal, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this application, the functions of the units may be implemented in the same piece of or a plurality of pieces of software and/or hardware.

A person skilled in the art should understand that embodiments of this application may be provided as a method, an apparatus, or a computer program product. Therefore, the embodiments of this application may use a form of hardware only embodiments, software only embodiments, or embodiments with a combination of software and hardware. In addition, in the embodiments of this application, a form of a computer program product that is implemented on one or more computer-usable storage media (including, but not limited to, a disk memory, a CD-ROM, an optical memory, and the like) that include computer-usable program code may be used.

A computer-readable storage medium is provided. The storage medium has a computer program stored therein. The computer program, when executed by a processor, implements the foregoing method for training a migration scene-based trajectory prediction model and the foregoing method for controlling an unmanned driving device.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A method for training a migration scene-based trajectory prediction model, performed on a service platform, comprising:

obtaining a first trajectory prediction model and a plurality of candidate training samples, wherein the first trajectory prediction model is a trajectory prediction model trained based on training samples in a preset geographical scene, the plurality of candidate training samples are training samples in a migration scene, a geographical region in which the migration scene is located is different from that of the preset geographical scene, and each of the candidate training samples comprises historical traveling trajectories of surrounding obstacles of a target device;

determining, for a candidate training sample of the plurality of candidate training samples, a reference value corresponding to the candidate training sample according to at least one of a trajectory feature corresponding to the candidate training sample or a prediction result of the first trajectory prediction model for the candidate training sample, wherein the reference value corresponding to the candidate training sample is used to represent a degree of distinction between a traveling characteristic of the historical traveling trajectories comprised in the candidate training sample and a traveling characteristic corresponding to the preset geographical scene;

selecting target training samples from the plurality of candidate training samples according to reference values corresponding to the plurality of candidate training samples;

training the first trajectory prediction model according to the target training samples, to obtain a second trajectory prediction model, wherein the second trajectory prediction model is configured to predict traveling trajectories of obstacles in the migration scene;

acquiring traveling trajectories of surrounding obstacles of an unmanned driving device;

obtaining obstacle trajectories by inputting the traveling trajectories of surrounding obstacles of the unmanned driving device into the second trajectory prediction; and controlling the unmanned driving device according to the obstacle trajectories;

wherein the training the first trajectory prediction model according to the target training samples, to obtain the second trajectory prediction model, comprises: determining a plurality of remaining training samples in the plurality of candidate training samples after training the first trajectory prediction model based on target training samples selected in an $(N-1)^{th}$ round of training, wherein the plurality of remaining training samples are candidate training samples in the plurality of candidate training samples other than target training samples selected in previous N−1 rounds, and N is a positive integer; re-determining reference values corresponding to the plurality of remaining training samples; selecting, according to the re-determined reference values corresponding to the plurality of remaining training samples, from the plurality of remaining training samples, target training samples required by an $N^{th}$ round of training; performing the $N^{th}$ round of training on the first trajectory prediction model according to the target training samples required by the $N^{th}$ round of training until the first trajectory prediction model meets a preset training objective, to obtain the second trajectory prediction model.

2. The method according to claim 1, wherein the determining the reference value corresponding to the candidate training sample according to at least one of the trajectory feature corresponding to the candidate training sample or the prediction result of the first trajectory prediction model for the candidate training sample comprises:

determining a first reference value corresponding to the candidate training sample according to the prediction result of the first trajectory prediction model for the candidate training sample, wherein the first reference value is used to represent a degree of uncertainty of trajectory prediction performed by the first trajectory prediction model based on the candidate training sample;

determining a second reference value corresponding to the candidate training sample according to the trajectory feature corresponding to the candidate training sample, wherein the second reference value is used to represent diversity of the candidate training sample in the training samples for training the first trajectory prediction model; and determining the reference value corresponding to the candidate training sample according to at least one of the first reference value corresponding to the candidate training sample or the second reference value corresponding to the candidate training sample.

3. The method according to claim 2, wherein the determining the first reference value corresponding to the candidate training sample according to the prediction result of the first trajectory prediction model for the candidate training sample comprises:

determining a difference between the prediction result of the first trajectory prediction model for the candidate training sample and an annotation result corresponding to the candidate training sample; and determining the first reference value corresponding to the candidate training sample according to the difference.

4. The method according to claim 2, wherein the determining the second reference value corresponding to the candidate training sample according to the trajectory feature corresponding to the candidate training sample comprises:

determining a difference between the trajectory feature corresponding to the candidate training sample and a trajectory feature corresponding to the training samples in the preset geographical scene as the second reference value corresponding to the candidate training sample.

5. The method according to claim 1, wherein the re-determining reference values corresponding to the plurality of remaining training samples comprises:

determining, for any remaining training sample, a second reference value corresponding to the remaining training sample, wherein the second reference value is a difference between a trajectory feature corresponding to the remaining training sample and a trajectory feature corresponding to the selected target training samples, and the second reference value is used to represent diversity of the remaining training sample in the training samples for training the first trajectory prediction model; and determining a reference value corresponding to the remaining training sample according to the second reference value corresponding to the remaining training sample.

6. A method for controlling an unmanned driving device, comprising:

obtaining traveling trajectories of surrounding obstacles of an unmanned driving device, wherein the unmanned driving device travels in a migration scene;

inputting the traveling trajectories into a pre-trained second trajectory prediction model, and outputting obstacle trajectories through the second trajectory prediction model, wherein the second trajectory prediction model is trained based on the method according to claim 1.

7. A non-transitory computer-readable storage medium, having a computer program stored therein, wherein the computer program, when executed by a processor, implements the following steps:

obtaining traveling trajectories of surrounding obstacles of an unmanned driving device, wherein the unmanned driving device travels in a migration scene;

inputting the traveling trajectories into a pre-trained second trajectory prediction model, and outputting obstacle trajectories through the second trajectory prediction model, wherein the second trajectory prediction model is trained based on the method according to claim 1.

8. An unmanned driving device, comprising a memory, a processor, and a computer program stored in the memory and executable by the processor, wherein when executing the program, the processor implements the following steps:

obtaining traveling trajectories of surrounding obstacles of an unmanned driving device, wherein the unmanned driving device travels in a migration scene; and inputting the traveling trajectories into a pre-trained second trajectory prediction model, and outputting obstacle trajectories through the second trajectory prediction model, wherein the second trajectory prediction model is trained based on the method according to claim 1.

9. A non-transitory computer-readable storage medium, having a computer program stored therein, wherein the computer program, when executed by a processor, implements the following steps:

obtaining a first trajectory prediction model and a plurality of candidate training samples, wherein the first trajectory prediction model is a trajectory prediction model trained based on training samples in a preset geographical scene, the plurality of candidate training samples are training samples in a migration scene, a geographical region in which the migration scene is located is different from that of the preset geographical scene, and each of the candidate training samples comprises historical traveling trajectories of surrounding obstacles of a target device;

determining, for a candidate training sample of the plurality of candidate training samples, a reference value corresponding to the candidate training sample according to at least one of a trajectory feature corresponding to the candidate training sample or a prediction result of the first trajectory prediction model for the candidate training sample, wherein the reference value corresponding to the candidate training sample is used to represent a degree of distinction between a traveling characteristic of the historical traveling trajectories comprised in the candidate training sample and a traveling characteristic corresponding to the preset geographical scene;

selecting target training samples from the plurality of candidate training samples according to reference values corresponding to the plurality of candidate training samples;

training the first trajectory prediction model according to the target training samples, to obtain a second trajectory prediction model, wherein the second trajectory prediction model is configured to predict traveling trajectories of obstacles in the migration scene;

acquiring traveling trajectories of surrounding obstacles of an unmanned driving device;

obtaining obstacle trajectories by inputting the traveling trajectories of surrounding obstacles of the unmanned driving device into the second trajectory prediction; and controlling the unmanned driving device according to the obstacle trajectories;

wherein the training the first trajectory prediction model according to the target training samples, to obtain the second trajectory prediction model, comprises: determining a plurality of remaining training samples in the plurality of candidate training samples after training the first trajectory prediction model based on target training samples selected in an $(N-1)^{th}$ round of training, wherein the plurality of remaining training samples are candidate training samples in the plurality of candidate training samples other than target training samples selected in previous N−1 rounds, and N is a positive integer; re-determining reference values corresponding to the plurality of remaining training samples; selecting, according to the re-determined reference values corresponding to the plurality of remaining training samples, from the plurality of remaining training samples, target training samples required by an $N^{th}$ round of training; performing the $N^{th}$ round of training on the first trajectory prediction model according to the target training samples required by the $N^{th}$ round of training until the first trajectory prediction model meets a preset training objective, to obtain the second trajectory prediction model.

10. The non-transitory computer-readable storage medium according to claim 9, wherein the computer program, when executed by the processor, implements the following steps:

determining a first reference value corresponding to the candidate training sample according to the prediction result of the first trajectory prediction model for the candidate training sample, wherein the first reference value is used to represent a degree of uncertainty of trajectory prediction performed by the first trajectory prediction model based on the candidate training sample;

determining a second reference value corresponding to the candidate training sample according to the trajectory feature corresponding to the candidate training sample, wherein the second reference value is used to represent diversity of the candidate training sample in the training samples for training the first trajectory prediction model; and determining the reference value corresponding to the candidate training sample according to at least one of the first reference value corresponding to the candidate training sample or the second reference value corresponding to the candidate training sample.

11. The non-transitory computer-readable storage medium according to claim 10, wherein the computer program, when executed by the processor, implements the following steps:

determining a difference between the prediction result of the first trajectory prediction model for the candidate training sample and an annotation result corresponding to the candidate training sample; and determining the first reference value corresponding to the candidate training sample according to the difference.

12. The non-transitory computer-readable storage medium according to claim 10, wherein the computer program, when executed by the processor, implements the following steps:

determining a difference between the trajectory feature corresponding to the candidate training sample and a trajectory feature corresponding to the training samples in the preset geographical scene as the second reference value corresponding to the candidate training sample.

13. The non-transitory computer-readable storage medium according to claim 9, wherein the computer program, when executed by the processor, implements the following steps:

determining, for any remaining training sample, a second reference value corresponding to the remaining training sample, wherein the second reference value is a difference between a trajectory feature corresponding to the remaining training sample and a trajectory feature corresponding to the selected target training samples, and the second reference value is used to represent diversity of the remaining training sample in the training samples for training the first trajectory prediction model; and determining a reference value corresponding to the remaining training sample according to the second reference value corresponding to the remaining training sample.

14. An unmanned driving device, comprising a memory, a processor, and a computer program stored in the memory and executable by the processor, wherein when executing the program, the processor implements the following steps:

obtaining a first trajectory prediction model and a plurality of candidate training samples, wherein the first trajectory prediction model is a trajectory prediction model trained based on training samples in a preset geographical scene, the plurality of candidate training samples are training samples in a migration scene, a geographical region in which the migration scene is located is different from that of the preset geographical scene, and each of the candidate training samples comprises historical traveling trajectories of surrounding obstacles of a target device;

determining, for a candidate training sample of the plurality of candidate training samples, a reference value corresponding to the candidate training sample according to at least one of a trajectory feature corresponding to the candidate training sample or a prediction result of the first trajectory prediction model for the candidate training sample, wherein the reference value corresponding to the candidate training sample is used to represent a degree of distinction between a traveling characteristic of the historical traveling trajectories comprised in the candidate training sample and a traveling characteristic corresponding to the preset geographical scene;

selecting target training samples from the plurality of candidate training samples according to reference values corresponding to the plurality of candidate training samples;

training the first trajectory prediction model according to the target training samples, to obtain a second trajectory prediction model, wherein the second trajectory prediction model is configured to predict traveling trajectories of obstacles in the migration scene;

acquiring traveling trajectories of surrounding obstacles of an unmanned driving device;

obtaining obstacle trajectories by inputting the traveling trajectories of surrounding obstacles of the unmanned driving device into the second trajectory prediction; and controlling the unmanned driving device according to the obstacle trajectories;

wherein the training the first trajectory prediction model according to the target training samples, to obtain the second trajectory prediction model, comprises: determining a plurality of remaining training samples in the plurality of candidate training samples after training the first trajectory prediction model based on target training samples selected in an $(N-1)^{th}$ round of training, wherein the plurality of remaining training samples are candidate training samples in the plurality of candidate training samples other than target training samples selected in previous N−1 rounds, and N is a positive integer; re-determining reference values corresponding to the plurality of remaining training samples; selecting, according to the re-determined reference values corresponding to the plurality of remaining training samples, from the plurality of remaining training samples, target training samples required by an $N^{th}$ round of training; performing the $N^{th}$ round of training on the first trajectory prediction model according to the target training samples required by the $N^{th}$ round of training until the first trajectory prediction model meets a preset training objective, to obtain the second trajectory prediction model.

15. The unmanned driving device according to claim 14, wherein when executing the program, the processor implements the following steps:

determining a first reference value corresponding to the candidate training sample according to the prediction result of the first trajectory prediction model for the candidate training sample, wherein the first reference value is used to represent a degree of uncertainty of trajectory prediction performed by the first trajectory prediction model based on the candidate training sample;

determining a second reference value corresponding to the candidate training sample according to the trajectory feature corresponding to the candidate training sample, wherein the second reference value is used to represent diversity of the candidate training sample in the training samples for training the first trajectory prediction model; and determining the reference value corresponding to the candidate training sample according to at least one of the first reference value corresponding to the candidate training sample or the second reference value corresponding to the candidate training sample.

16. The unmanned driving device according to claim 15, wherein when executing the program, the processor implements the following steps:

determining a difference between the prediction result of the first trajectory prediction model for the candidate training sample and an annotation result corresponding to the candidate training sample; and determining the first reference value corresponding to the candidate training sample according to the difference.

17. The unmanned driving device according to claim 15, wherein when executing the program, the processor implements the following steps:

determining a difference between the trajectory feature corresponding to the candidate training sample and a trajectory feature corresponding to the training samples in the preset geographical scene as the second reference value corresponding to the candidate training sample.

* * * * *